US009227535B2

(12) United States Patent
Coman et al.

(10) Patent No.: US 9,227,535 B2
(45) Date of Patent: Jan. 5, 2016

(54) AIRCRAFT INTEGRATED CHILD SEAT (71) Applicant: ZODIAC SEATS US LLC, Gainesville, TX (US)

(72) Inventors: Sorin Coman, Sterling Heights, MI (US); Michael Romano, Denton, TX (US); Aamir Jafri, Little Elm, TX (US); Dianna Sabo, The Colony, TX (US); Rik Westerink, The Hague (NL); Armando Valdes, Krum, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 14/036,358

(22) Filed: Sep. 25, 2013

(65) Prior Publication Data

US 2014/0084651 A1    Mar. 27, 2014

Related U.S. Application Data (60) Provisional application No. 61/705,256, filed on Sep. 25, 2012.

(51) Int. Cl.
*B60N 2/30* (2006.01)
*B60N 2/26* (2006.01)
*B64D 11/06* (2006.01)
*B60R 22/00* (2006.01)

(52) U.S. Cl.
CPC .............. *B60N 2/265* (2013.01); *B60N 2/3084* (2013.01); *B60R 22/00* (2013.01); *B64D 11/06* (2013.01); *B64D 11/0612* (2014.12); *Y02T 50/46* (2013.01)

(58) Field of Classification Search
CPC .... B60N 2/265; B60N 2/3084; B60N 2/3081; B64D 11/0612
USPC .................................................. 297/238, 484
See application file for complete search history.

(56) References Cited

U.S. PATENT DOCUMENTS 4,402,548 A * 9/1983 Mason .......................... 297/464
4,690,455 A * 9/1987 Bailey .................. B60N 2/3084
297/117

(Continued)

FOREIGN PATENT DOCUMENTS

CA        2311304 A1 *  6/1999   ........... B60N 2/3084
EP        0803398 A2 * 10/1997   ........... B60N 2/3084

(Continued)

*Primary Examiner* — Ryan Kwiecinski
(74) *Attorney, Agent, or Firm* — Kilpatrick Townsend & Stockton LLP; Dean W. Russell; Shin Tsen Chang (57) ABSTRACT The present invention generally relates to passenger aircraft seats. Some examples provide systems for integrating a child seat into a certified aircraft seat. Some examples include a passenger seat backrest having an integrated child seat. An integrated child seat base may be moved between a stowed position and a deployed position. When in the stowed position, the integrated child seat base may fit within a recessed surface of the seat backrest and the seat may then accommodate an adult passenger. When in a deployed position, the integrated child seat may then accommodate a child passenger. The integrated seat may include a harness system that extends through the seat backrest and couples with an internal support structure of seat backrest. In some embodiments the mounting points of the harness system may be reinforced with stiff brackets attached to the internal support structure.

18 Claims, 6 Drawing Sheets (56) References Cited

U.S. PATENT DOCUMENTS

| | | | | |
|---|---|---|---|---|
| 5,398,997 A * | 3/1995 | McFalls | B60R 22/357 | 242/382 |
| 5,466,043 A * | 11/1995 | Lambert | B60N 2/3084 | 297/14 |
| 5,472,260 A * | 12/1995 | Czapski | B60N 2/3084 | 297/112 |
| 5,498,062 A * | 3/1996 | Holdampf | B60N 2/3084 | 297/14 |
| 5,503,461 A * | 4/1996 | Schreier | B60N 2/3084 | 297/467 |
| 5,611,603 A * | 3/1997 | Gray | B60R 22/105 | 242/378.4 |
| 5,662,377 A * | 9/1997 | Holdampf | B60N 2/3013 | 297/14 |
| 5,704,684 A * | 1/1998 | Dukatz et al. | 297/238 | |
| 5,704,685 A * | 1/1998 | Handa | B60N 2/3084 | 297/238 |
| 5,716,097 A * | 2/1998 | Peck | B60N 2/3084 | 297/238 |
| 5,743,593 A * | 4/1998 | Vogt | B60N 2/3084 | 297/238 |
| 5,799,894 A * | 9/1998 | Kohlndorfer | B60R 22/415 | 242/382.4 |
| 5,806,926 A * | 9/1998 | Parsons | B60N 2/3081 | 297/14 |
| 5,899,534 A * | 5/1999 | Gray | B60N 2/3084 | 297/238 |
| 6,913,227 B1 * | 7/2005 | Mahmulyin | B64D 11/06 | 244/118.5 |
| 7,029,067 B2 * | 4/2006 | Vits | B60N 2/688 | 297/216.12 |
| 7,070,239 B1 * | 7/2006 | Ugrekhelidze | B60N 2/3086 | 297/105 |
| 7,261,381 B2 * | 8/2007 | Tsai | B60N 2/2812 | 297/238 |
| 7,537,284 B1 * | 5/2009 | Antorcha | 297/219.12 | |
| 7,887,140 B1 * | 2/2011 | Forlivio | B60N 2/26 | 297/238 |
| 8,544,950 B2 * | 10/2013 | Merensky | 297/238 | |
| 2002/0030394 A1 * | 3/2002 | Ito | B60N 2/3084 | 297/256 |
| 2013/0187421 A1 * | 7/2013 | Foye et al. | 297/232 | |
| 2014/0062160 A1 * | 3/2014 | Conley | B60N 2/2812 | 297/440.15 |
| 2015/0130235 A1 * | 5/2015 | Herut | B60N 2/3084 | 297/238 |

FOREIGN PATENT DOCUMENTS

| | | | | |
|---|---|---|---|---|
| EP | 1695863 A1 * | 8/2006 | | B60N 2/2878 |
| WO | WO 2013016310 A1 * | 1/2013 | | B60R 22/024 |

* cited by examiner

AIRCRAFT INTEGRATED CHILD SEAT

CROSS REFERENCE TO RELATED APPLICATION

This application claims priority to and the benefit of U.S. Provisional Application No. 61/705,256 filed on Sep. 25, 2012, the contents of which are incorporated herein by reference.

BACKGROUND OF THE INVENTION

The present invention generally relates to aircraft passenger seats. More specifically, embodiments of the present invention relate to systems, methods, and apparatuses for integrating and/or securing a child seat into a certified aircraft seat.

The designs of current aircraft seats and restraint systems are inadequate for safely securing and restraining children. As such, the Federal Aviation Administration recommends that all children weighing under 40 pounds be seated in an approved child restraint system (CRS) in order to protect a child during take-off, landing, taxing, turbulence, and in the event of an emergency. Many current aftermarket child seats are designed for use in automobiles and thus are not designed or tested for use in an aircraft seat system. Hence many aftermarket child seats are not certified or are too large for use with aircraft seats. Additionally, aftermarket child seats may weigh a significant amount, be cumbersome to install, and difficult to transport. The use of strap on harnesses and belly harnesses have been proposed to address some of the safety issues, however, both of these attempts were banned by the FAA in the United States and have been shown to be ineffective.

When using portable child seats in an airplane, the portable seat must be placed in the aircraft seat and restrained to the seat using the already existing seat belt. Traditional aircraft seat belts are secured to seat spreaders at a low point so that the belt rests comfortably across the lap of a seated adult passenger. One problem with using the already existing aircraft seat belt is that a forward facing child seat may lack support on the top section of the seat. Thus securing a portable child seat in such a manner may not provide adequate protection for a seated child in the event of heavy turbulence or a crash. Portable child seats may also be disadvantageous because they may have a significant weight penalty (e.g., approximately 15 lbs.).

In light of the above, it would be desirable to provide improved systems, methods and apparatuses for safely securing and restraining children in an aircraft. In particular, improvements can be made to provide for a safer and more robust child restraint system for use in passenger aircraft.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Some embodiments of the invention are directed to improved methods of securing a child seat to a certified aircraft seat. Additionally, some embodiments of the present invention are directed to an integrated child seat which may be an integral part of the passenger seat design, thereby having a reduced weight penalty compared to a separate portable child seat. The integrated child seat may be deployed from a stowed position to a deployed position in order to accommodate and safely secure a seated child. In some embodiments, the child seat may be integrated into an aircraft seat backrest. When deployed, the child seat may be forward facing and include a five-point harness for securing and restraining a child. Preferably, the five-point harness may be routed through the integrated seat backrest structure and coupled with the seat backrest and/or an internal seat frame structure. Optionally, the mounting points or routing channels are reinforced with unique brackets attached to the internal seat frame structure. The brackets may couple with the back side of the internal seat frame structure and may help distribute load forces from a routed harness to the internal frame. In some embodiments, the child seat may be returned from a deployed position to a stowed position by stowing the child seat into the aircraft seat backrest such that the aircraft seat may then accommodate an adult passenger. Advantageously, some embodiments of the present invention may provide an integrated child seat that is intuitive to operate and which does not require installation or modification by flight crew or maintenance personnel.

In some aspects of the present invention, a passenger airplane seat is provided. The passenger airplane seat may include a seat backrest supported by an internal frame structure and the seat backrest may include an integrated seat. The integrated seat may include an integrated seat base, an integrated seat backrest, and an integrated seat harness. The integrated seat base may be moveable between a stowed position, where the seat may be configured to accommodate an adult, and a deployed position, where the seat may be configured to accommodate a child. The integrated seat harness may route through the integrated seat backrest and couple with the internal frame structure.

In some embodiments, the internal frame structure may include one or more routing channels for coupling the integrated seat harness. Optionally, the one or more routing channels may include an anti-friction trim for harness routing. In some embodiments, the one or more routing channels may be reinforced with one or more brackets disposed around the one or more routing channels. The one or more brackets may be coupled with the internal frame structure on a back side of the internal frame structure—the back side being opposite the integrated seat. Such a configuration may provide improved mechanical stability around the routing channels and may improve the distribution of load forces from a coupled harness to the internal seat frame, thereby providing a more reliable and secure harness.

The one or more routing channels may optionally extend through the one or more brackets. In some embodiments, the one or more routing channels of the internal frame structure may include two upper routing channels for receiving the integrated seat harness. The two upper routing channels may be disposed at a first height and may be defined as slit openings in a horizontal orientation. Further, the one or more routing channels of the internal frame structure may also include two lower routing channels for receiving the integrated seat harness. The two lower routing channels may be at a second height and may be defined as slit openings in a vertical orientation. The lower routing channels may be at a lower height than the upper routing channels. The one or more routing channels of the internal frame structure may also include two middle routing channels for receiving the integrated seat harness. The two middle routing channels may be disposed at a third height and may be defined by a slit opening in a horizontal orientation. The middle routing channels may be positioned at a height between the upper routing channels and the lower routing channels.

In some embodiments, the one or more brackets may include an upper bracket for reinforcing the two upper routing channels. The upper bracket may be coupled with the back side of the internal frame structure at the first height. The upper bracket may be disposed around the two upper routing channels such that the two upper routing channels extend through the upper bracket. Optionally, the one or more brackets may further include a lower bracket for reinforcing the two lower routing channels. The lower bracket may be coupled with the back side of the internal frame structure at the second height. The lower bracket may be disposed around the two lower routing channels such that the two lower routing channels extend through the lower bracket. In some embodiments, the one or more brackets also include a middle bracket for reinforcing the two middle routing channels. The middle bracket may be coupled with the back side of the internal frame structure at the third height. The middle bracket may be disposed around the two middle routing channels such that the two middle routing channels extend through the middle bracket.

In some embodiments, the integrated seat base may be supported by an internal integrated seat base frame structure and the integrated seat harness may also route through the integrated seat base and couple with the internal integrated seat base frame structure. Optionally, the integrated seat harness may route horizontally between the two lower routing channels. Additionally, in some embodiments, the integrated seat harness may route vertically between the two upper routing channels and the two middle routing channels. In some embodiments, the integrated seat may be manufactured from an antimicrobial material, an antibacterial material, a water-resistant material, and/or a stain-resistant material.

In another aspect of the present invention, a passenger seat is provided that may include a seat backrest supported by an internal frame structure and the internal frame structure may including one or more routing channels for coupling a seat harness apparatus. The one or more routing channels may be reinforced with one or more brackets disposed around the one or more routing channels. The one or more brackets may be coupled with the internal frame structure on a back side of the internal frame structure—the back side being opposite the seat harness apparatus. In some embodiments, the one or more routing channels of the internal frame structure may include two upper routing channels for receiving the seat harness apparatus. The two upper routing channels may be disposed at a first height and in a horizontal orientation. Additionally, the one or more routing channels of the internal frame structure may further include two lower routing channels for receiving the seat harness apparatus. The two lower routing channels may be at a second height and in a vertical orientation. The second height may be less than the first height. Optionally, the one or more routing channels of the internal frame structure may further include two middle routing channels for receiving the seat harness apparatus. The two middle routing channels disposed at a third height and in a horizontal orientation. The third height may be less than the first height and greater than the second height.

In some embodiments, the one or more brackets may include an upper bracket for reinforcing the two upper routing channels. The upper bracket may be coupled with the back side of the internal frame structure at the first height. The upper bracket may be disposed around the two upper routing channels such that the two upper routing channels extend through the upper bracket. In some embodiments, the one or more brackets may further include a lower bracket for reinforcing the two lower routing channels. The lower bracket may be coupled with the back side of the internal frame structure at the second height. The lower bracket may be disposed around the two lower routing channels such that the two lower routing channels extend through the lower bracket. Optionally, the one or more brackets may further include a middle bracket for reinforcing the two middle routing channels. The middle bracket may be coupled with the back side of the internal frame structure at the third height. The middle bracket may be disposed around the two middle routing channels such that the two middle routing channels extend through the middle bracket. In some embodiments, the passenger airplane seat may further include a seat harness apparatus. The seat harness apparatus may route horizontally between the two lower routing channels. In some embodiments, the seat harness may route vertically between the two upper routing channels and the two middle routing channels.

In other embodiments of the present invention, a passenger airplane seat for use in commercial aircraft is provided. The passenger airplane seat may include a seat base coupled with a seat backrest for supporting a seated passenger. The seat backrest may be internally supported by an internal frame structure. The passenger airplane seat may include seat spreaders disposed on opposing sides of the seat base and a seat belt attached to the seat spreaders. The seat backrest may include an integrated seat and the integrated seat may include an integrated seat base, an integrated seat backrest, and a five-point harness system. The integrated seat base may be moveable between a stowed position and a deployed position. The passenger airplane seat may be configured to accommodate an adult passenger when the integrated seat base is in the stowed position and may be further configured to accommodate a child passenger when the integrated seat base is in the deployed position. Preferably, the five-point harness of the integrated seat may couple with the internal frame structure by routing through a plurality of routing channels extending through the integrated seat backrest and through the internal frame structure. Optionally, one or more reinforcing brackets may be coupled with a back side of the internal frame structure and disposed around the plurality of routing channels— the back side being opposite the integrated seat.

The invention will be better understood on reading the following description and examining the figures that accompany it. These figures are provided by way of illustration only and are in no way limiting on the invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1A:
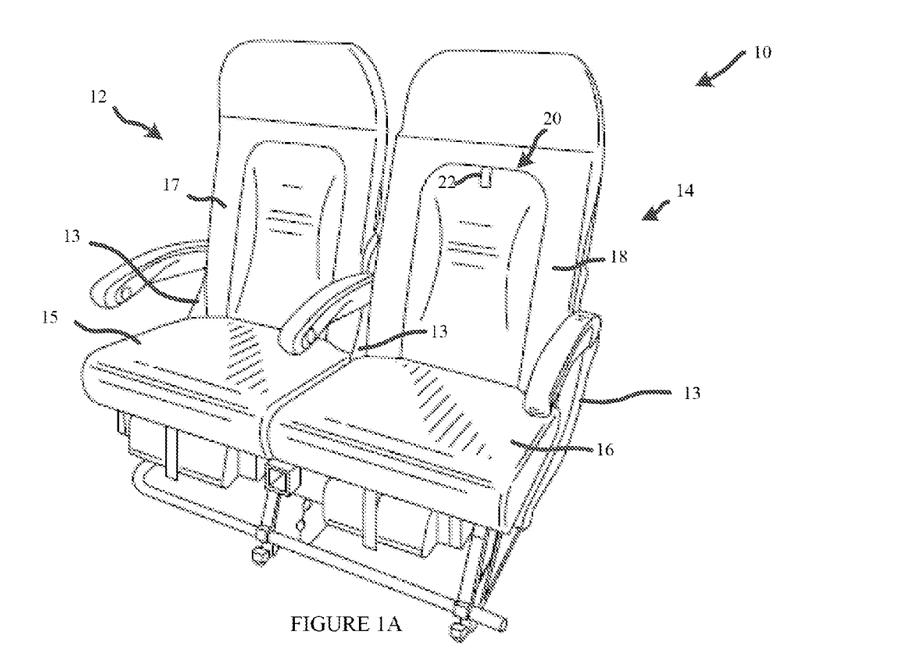
FIGS. 1A-1C illustrate certain exemplary embodiments of the present invention and the deployment of the exemplary integrated seat.
Figure 1B:
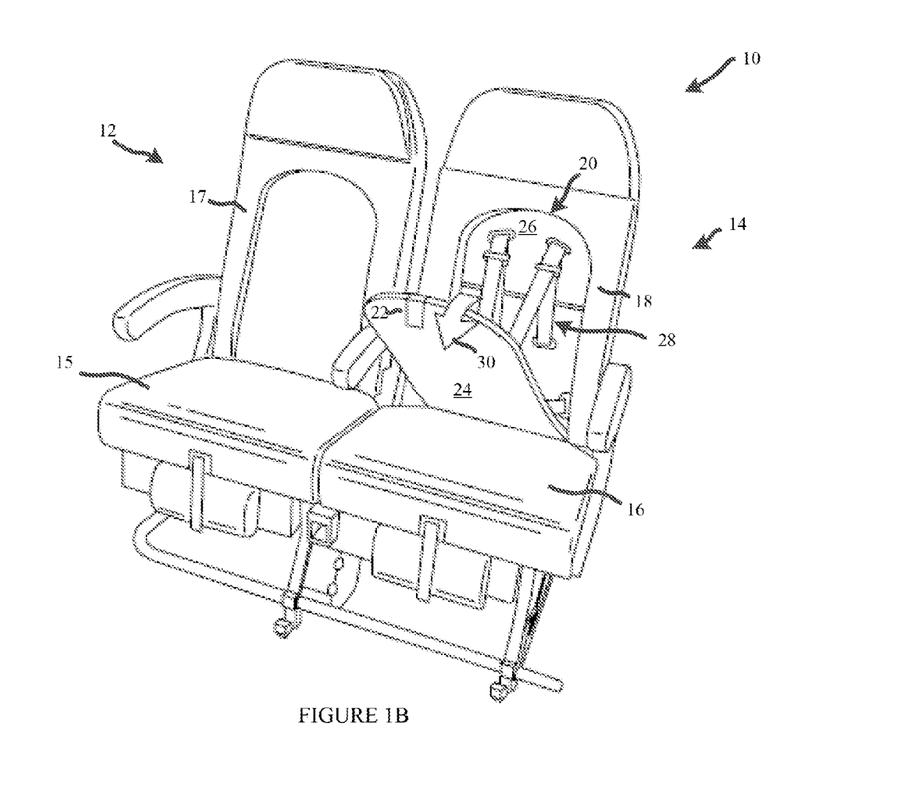
Figure 1C:
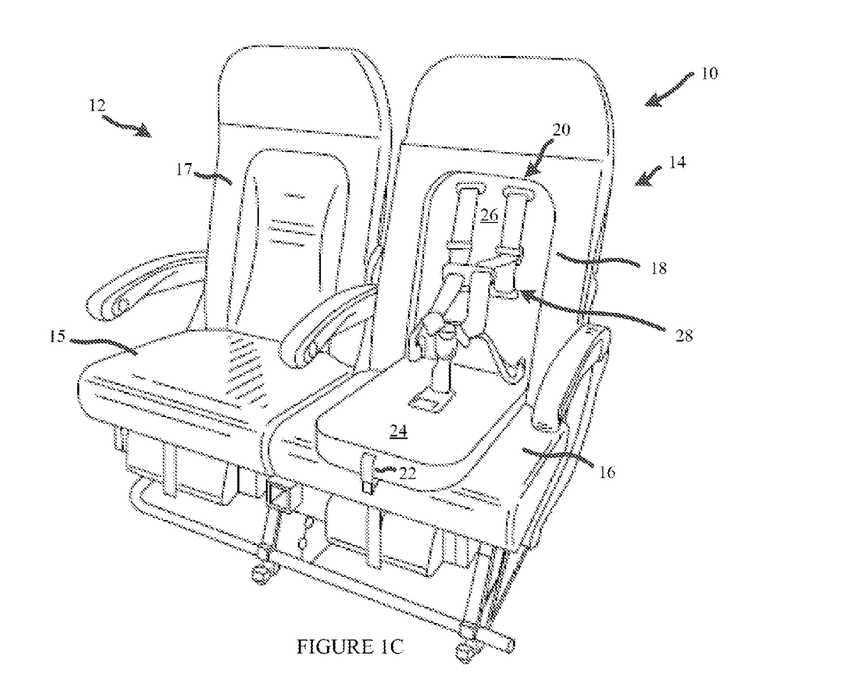

FIGS. 1A-1C illustrate exemplary embodiments of the present invention and the deployment of an exemplary integrated seat. FIG. 1A illustrates an exemplary aircraft passenger seat system 10 including passenger seats 12, 14. Passenger seats 12, 14 are certified aircraft seats and are suitable for seating adult passengers and securing them with a seat belt system. Traditionally, the seat belt is attached to seat spreaders 13 that are positioned on each side of the seats 12, 14. Passenger seats 12, 14 include a seat base 15, 16 and a seat backrest 17, 18, respectively. Seat backrest 18 includes an integrated seat 20 in a stowed position whereas seat backrest 17 is illustrated without an integrated seat for comparison purposes. In some embodiments, integrated seat 20 may include a pull tab 22 to facilitate deployment of the integrated seat 20 from the stowed position to a deployed position, as illustrated in FIG. 1B and FIG. 1C.

FIG. 1B illustrates the deployment of integrated seat 20 from the stowed position shown in FIG. 1A to a deployed position shown in FIG. 1C. Integrated seat 20 includes an integrated seat base 24, an integrated seat backrest 26, and an integrated seat harness 28. The integrated seat base 24 may pivot in the direction of arrow 30 relative to integrated seat backrest 26 when deploying from the stowed position to the deployed position.

FIG. 1C illustrates integrated seat 20 in the deployed position. In the deployed position, integrated seat base 24 may rest on seat base 16 and/or may be locked in a position relative to seat backrest 26. When in the deployed position, integrated seat base 24, integrated seat backrest 26, and integrated seat harness 28 may form a seat suitable for safely securing and restraining a child. In order to return the integrated seat 20 from the deployed position to the stowed position, integrated seat base 24 may be unlocked from the deployed position if needed, and moved back to the stowed position illustrated in FIG. 1A.

While passenger seat system 10 is illustrated with two passenger seats 12, 14, it should be understood that passenger seat system 10 may include any number of passenger seats. For example, some passenger seat systems may include one, three, four, five, six or more passenger seats. Additionally, while only passenger seat 14 is illustrated with an integrated seat 20, it should be understood that any, some or all passenger seats in a passenger seat system may include an integrated seat 20. Advantageously, in some embodiments, an integrated child seat may have a lower weight penalty compared to a separate carry-on child seat.

In some embodiments, when integrated seat 20 is in a stowed position, passenger seat 14 has an outward appearance and configuration similar to passenger seat 12. Accordingly, passenger seat 14 may accommodate adult passengers when the integrated seat 20 is stowed. In some embodiments, seat backrest 18 may include a rearward relief in order to completely house the integrated seat 20 when the integrated seat 20 is in the stowed position. Optionally, when stowed, integrated seat 20 may be locked in place or friction fit within the rearward relief to keep the integrated seat 20 in the stowed position. When deployed to the deployed position, it may be preferable to lock integrated seat base 24 relative to integrated seat backrest 26 in order to limit movement of the integrated seat 20 while the seat is in use and during aircraft take-off, landing, taxing, in-flight turbulence, and/or during emergency situations. In some embodiments, integrated seat base 24 and/or integrated seat backrest 26 may include a cover or cushion fashioned out of an antibacterial, antimicrobial, water-resistant, and/or stain resistant material.

Figure 2:
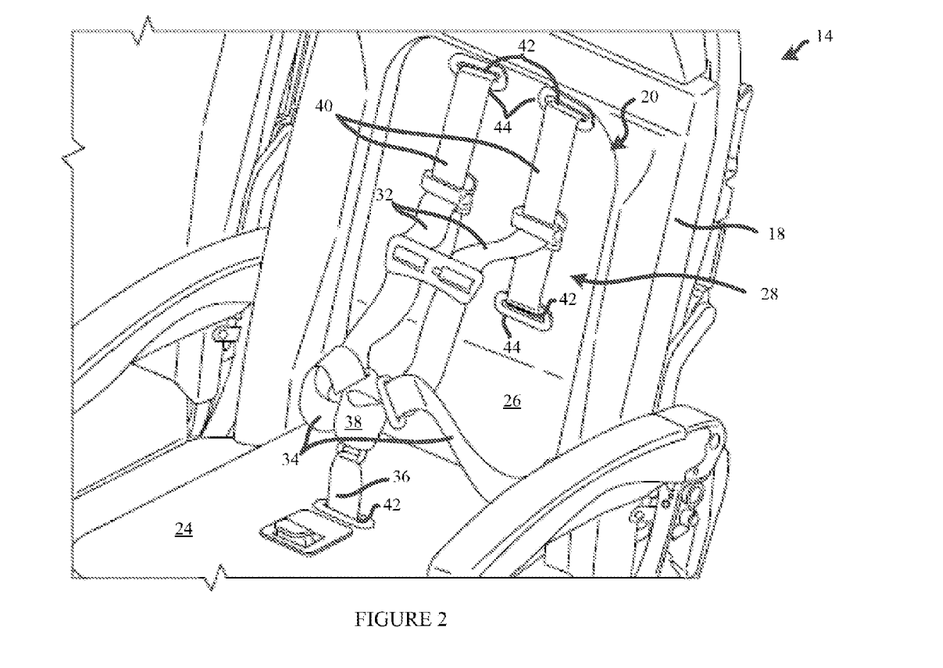
FIG. 2 illustrates details of an exemplary harness system for use with the illustrated integrated seat.

In some embodiments, the integrated seat harness 28 may be concealed by the integrated seat base 24 when the integrated seat base 24 is in the stowed position. The integrated seat harness 28 is preferably a five-point seat harness as illustrated in FIGS. 1A-1C. Advantageously, a five-point harness may support and transfer forces over the hips and shoulders of a child's body. Other configurations are possible, such as a two-point lap or sash harness, or a three-point, four-point, six-point harness, etc. FIG. 2 illustrates details of an exemplary five-point harness system 28 for use with the illustrated integrated seat 20. The five-point harness system 28 includes two shoulder straps 32, two pelvic straps 34, and a crotch strap 36. In some embodiments, and as illustrated in FIG. 2, shoulder straps 32 and corresponding pelvic straps 34 may be formed from a single belt. Each strap 32, 34, 36 may couple to a buckle release mechanism 38. Integrated seat harness 28 may also include a channel for belt adjustment, a crotch strap adjustment and pelvic strap adjustment. Additionally, shoulder strap height may be adjusted by positioning and securing shoulder straps 34 at a desired height along portion 40. Portion 40 and pelvic straps 34 may route through integrated seat backrest 26 using routing channels 42. Routing channels 42 may be slits in the integrated seat backrest 26 and may employ anti-friction trims 44 for harness routing. In some embodiments, integrated seat base 24 may be supported by an internal frame structure and may include one or more routing channels to couple with integrated harness 28. For example, as illustrated in FIG. 2, crotch strap 36 may route through routing channel 42 to couple with an internal frame structure of integrated seat base 24. Preferably, in some embodiments, portion 40 and pelvic straps 34 route through integrated seat backrest 26 to attach to and secure integrated seat harness 28 to an internal seat backrest frame structure 46 as can be more clearly seen in FIG. 3.

Figure 3:
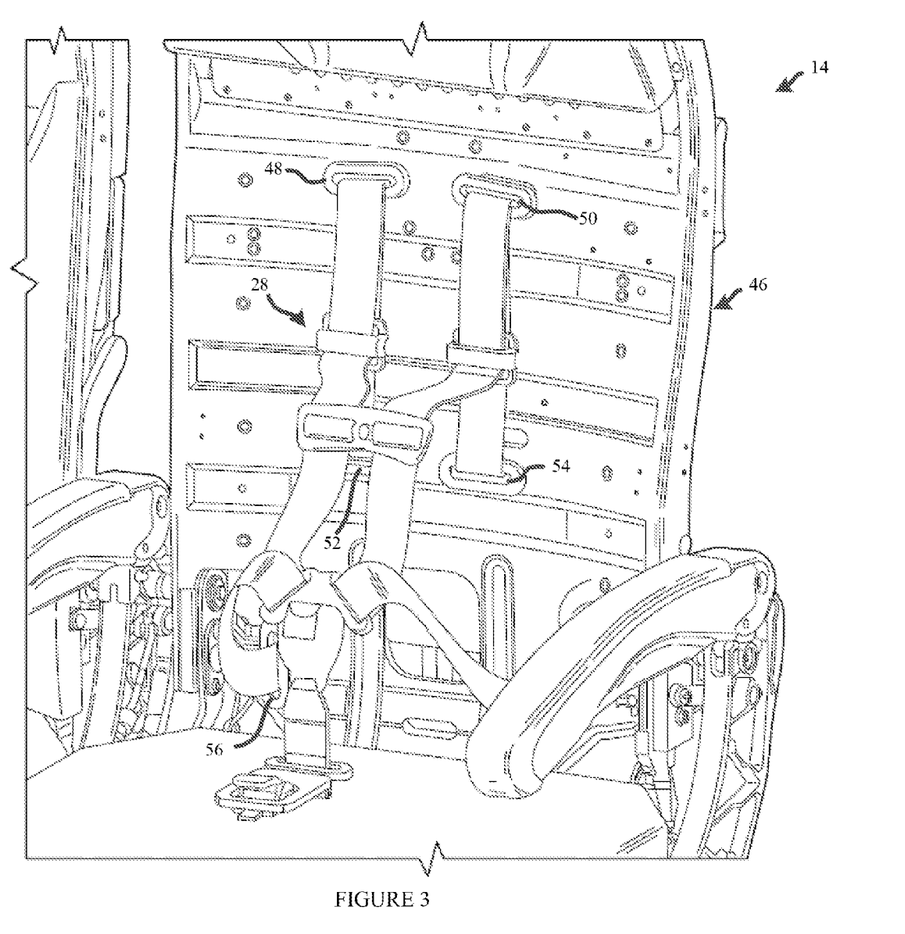
FIG. 3 illustrates an exemplary seat backrest frame structure according to some embodiments of the present invention for attaching the integrated seat illustrated in FIG. 2.

FIG. 3 illustrates exemplary passenger seat 14 without a seat backrest cushion to illustrate some details of an exemplary attachment of integrated seat harness 28 with internal frame structure 46. As shown in FIG. 3, internal frame structure 46 may include a plurality of routing channels for coupling with integrated seat harness 28. The plurality of routing channels may include two upper routing channels 48, 50, two middle routing channels 52, 54, and/or two lower routing channels 56, 58 (illustrated in FIG. 4) that extend through seat backrest frame structure 46. The routing channels may be slit openings for routing one or more portions of harness 28 through seat backrest frame structure 46. Upper routing channels 48, 50 and middle routing channels 52, 54 may have a generally horizontal orientation. Lower routing channels 56, 58 may have a generally vertical orientation. Advantageously, routing integrated seat harness 28 through upper routing channels 48, 50 and/or middle routing channels 52, 54 may provide support on the top section of a child seat and may provide improved protection for a seated person in the event of turbulence or a crash. In some embodiments, a portion of integrated seat harness 28 may route vertically between routing channel 48 and routing channel 52 to couple harness 28 with seat backrest frame structure 46. A portion of integrated seat harness 28 may also route vertically between routing channel 50 and routing channel 54. In some embodiments, pelvic straps 34 route horizontally between routing channel 56 and routing channel 58, can be seen in FIGS. 4A-4B.

Optionally the plurality of routing channels may include trim 44 which also extends through integrated seat backrest 26 and through seat backrest frame structure 46 or which extend through integrated seat base 24 and through its internal support structure. According to some embodiments of the present invention, seat backrest frame structure 46 may couple with one or more brackets for reinforcing the one or more routing channels as shown in FIGS. 4A-4B.

Figure 4A:
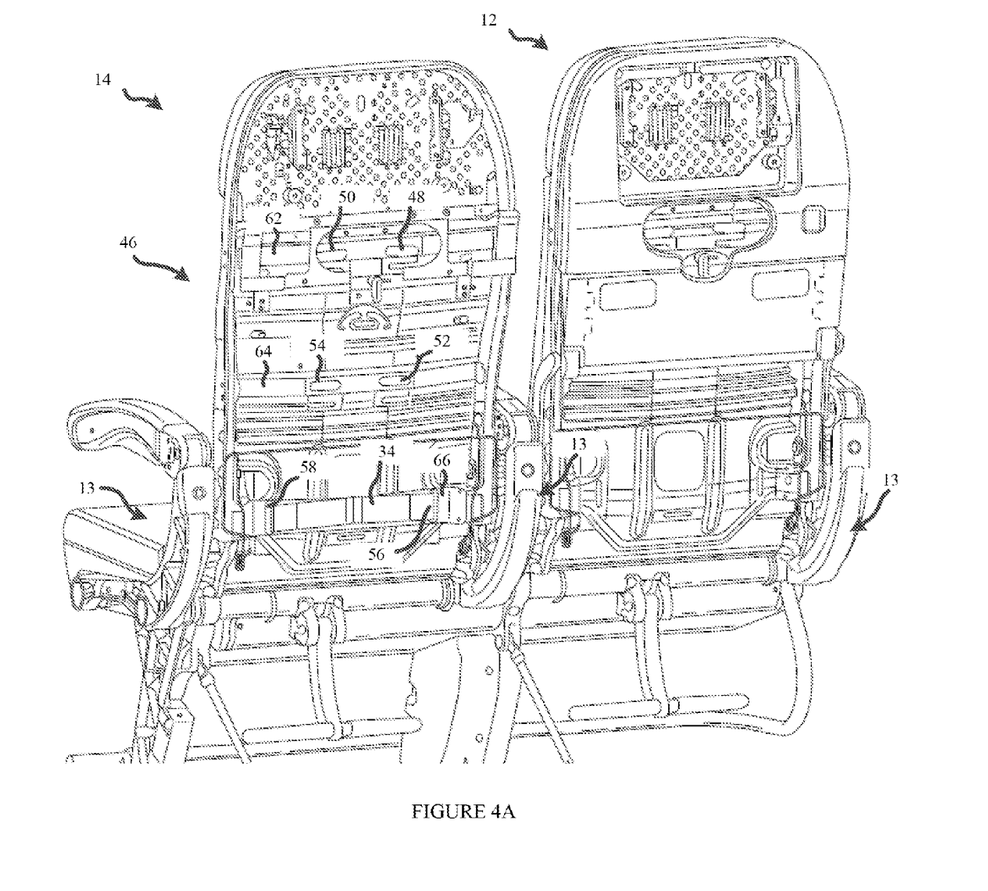
FIGS. 4A-4C illustrate the back side of an exemplary seat backrest frame structure according to some embodiments of the present invention.
Figure 4B:
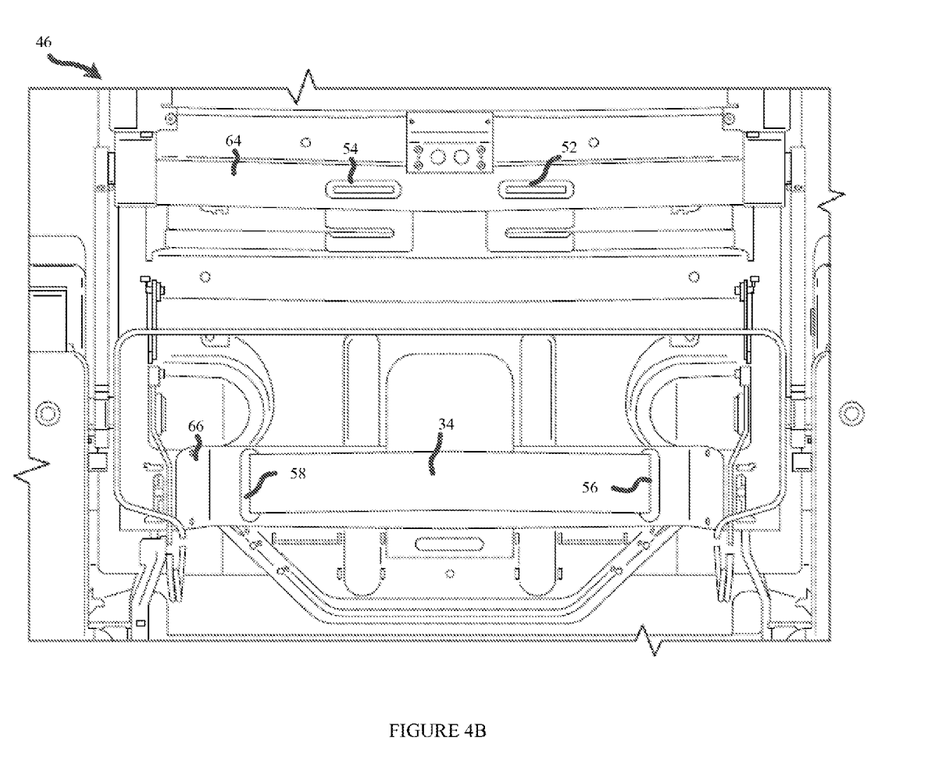
Figure 4C:
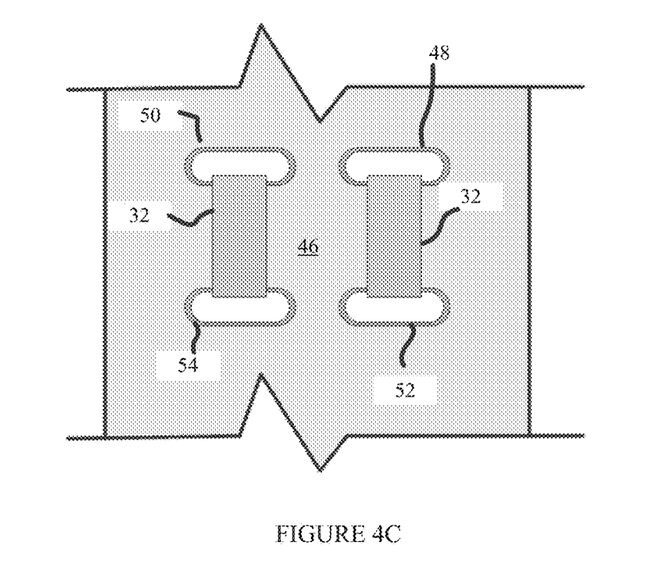

FIGS. 4A-4C illustrate the back side of seat backrest frame structure 46 according to some embodiments of the present invention. Frame structure can be constructed from composite materials, sheet metal, metal tubing for the frame or any suitable combination of such materials. In the illustrated embodiment, the one or more brackets include an upper bracket 62, a middle bracket 64, and a lower bracket 66 that attach on the back side of seat backrest frame structure 46. The brackets may be constructed from composite materials, sheet metal, plastics or any suitable combination of such mentioned materials. Upper bracket 62 may be positioned around upper routing channels 48, 50 so as to reinforce the upper routing channels 48, 50. Middle bracket 64 may be positioned around middle routing channels 52, 54 so as to reinforce the middle routing channels 52, 54. Lower bracket 66 may be positioned around lower routing channels 56, 58 so as to reinforce the lower routing channels 56, 58. In some embodiments, routing channels and/or corresponding trims may extend through the reinforcing bracket. The reinforcing brackets may extend horizontally across the back side of seat backrest frame structure 46 and may be mechanically coupled with seat backrest frame structure 46 using one or more fasteners and/or chemically coupled with seat backrest frame structure 46 with an adhesive compound. The reinforcing brackets 62, 64, 66 may help distribute load forces from an attached seat harness to the seat backrest frame structure 46 thereby providing an improved restraint system. Accordingly, some embodiments of the present invention may decrease the probability and severity of injury to a restrained passenger during take-off, landing, taxing, inflight turbulence and in the event of an emergency situation. FIG. 4C illustrates belt 32 routing between the upper channels 48, 50 and middle channels 52, 54, respectively, along the back side of the internal frame structure 46.

While the embodiment shown in FIGS. 4A-4C includes three reinforcing brackets 62, 64, 66, other embodiments of the invention may use one, two, four, or more brackets for reinforcing the one or more routing channels. In some embodiments, each routing channel may be individually reinforced by a corresponding bracket. Other embodiments of the present invention may forgo the use of any reinforcing brackets. In such an embodiment, the mounting points may be an integral part of the composite back design thereby eliminating the need for additional reinforcing components.

Further, some embodiments of the present invention may provide an aircraft passenger seat where the passenger seat base includes the integrated seat. In some embodiments, the integrated seat may be a rearward facing child seat when deployed from the stowed position to a deployed position. In such an embodiment, the integrated seat backrest may fold out from a stowed position away from the seat backrest and may be locked in position. The integrated seat harness may route through the seat base and couple with an internal frame structure of the seat base. In some embodiments, the internal frame structure of the seat base may include a plurality of routing channels for routing and securing the integrated seat harness.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A passenger airplane seat, comprising:
    an internal frame structure having a plurality of routing channels, the plurality of routing channels comprising a first routing channel and a second routing channel;
    a first reinforcing bracket coupled to the internal frame structure about one or more of the plurality of routing channels of the internal frame structure, the first reinforcing bracket attached to a back side of the internal frame structure;
    aircraft seat spreaders coupled to each side of the internal frame structure of the passenger airplane seat;
    a seat backrest supported by the internal frame structure, the seat backrest including an integrated seat on a front side of the internal frame structure opposite the back side of the internal frame structure;
    the integrated seat comprising an integrated seat base, an integrated seat backrest, and an integrated seat harness; and
    the integrated seat base moveable between a stowed position and a deployed position;
    wherein the integrated seat harness includes one or more belts that route from the front side of the internal frame structure through the integrated seat backrest, through the first routing channel of the internal frame structure, and through the first reinforcing bracket on the back side of the internal frame structure, and routes from the back side of the internal frame structure through the second routing channel of the internal frame structure to the front side of the internal frame structure;
    wherein the first and second routing channels extend through the first reinforcing bracket such that the first reinforcing bracket surrounds an opening of the first and second routing channels on the back side of the internal frame structure.

2. The passenger airplane seat of claim 1, wherein the first and second routing channels include an anti-friction trim for harness routing, the anti-friction trim extending from a front side of the seat backrest through the first reinforcing bracket to the back side of the internal frame structure.

3. The passenger airplane seat of claim 1, wherein the first reinforcing bracket is welded with the internal frame structure on the back side of the internal frame structure.

4. The passenger airplane seat of claim 1, wherein the plurality of routing channels of the internal frame structure comprise two upper routing channels for receiving the integrated seat harness, the two upper routing channels disposed at a first height and in a horizontal orientation.

5. The passenger airplane seat of claim 4, wherein the first and second routing channels of the internal frame structure comprise two lower routing channels for receiving the integrated seat harness, the two lower routing channels at a second height and in a vertical orientation, the second height being less than the first height.

6. The passenger airplane seat of claim 5, wherein the plurality of routing channels of the internal frame structure further comprise two middle routing channels for receiving the integrated seat harness, the two middle routing channels disposed at a third height and in a horizontal orientation, the third height being less than the first height and greater than the second height.

7. The passenger airplane seat of claim 6, further comprising an upper reinforcing bracket for reinforcing the two upper routing channels, the upper reinforcing bracket coupled with the back side of the internal frame structure at the first height, the upper reinforcing bracket disposed around the two upper routing channels such that the upper reinforcing bracket surrounds an opening of the two upper routing channels along the back side of the internal frame structure.

8. The passenger airplane seat of claim 7, wherein the first reinforcing bracket comprises a lower bracket for reinforcing the two lower routing channels, the lower bracket coupled with the back side of the internal frame structure at the second height.

9. The passenger airplane seat of claim 8, further comprising a middle reinforcing bracket for reinforcing the two middle routing channels, the middle reinforcing bracket coupled with the back side of the internal frame structure at the third height, the middle reinforcing bracket disposed around the two middle routing channels such that the middle reinforcing bracket surrounds an opening of the two middle routing channels along the back side of the internal frame structure.

10. The passenger airplane seat of claim 9, wherein the integrated seat base is supported by an internal integrated seat base frame structure, and wherein the integrated seat harness routes through the integrated seat base and couples with the internal integrated seat base frame structure.

11. The passenger airplane seat of claim 10, wherein the one or more belts of the integrated seat harness route horizontally between the two lower routing channels along the back side of the internal frame structure; and wherein the one or more belts of the integrated seat harness route vertically between one of the two upper routing channels and one of the two middle routing channels along the back side of the internal frame structure.

12. The passenger airplane seat of claim 1, wherein the integrated seat comprises an antimicrobial material, an antibacterial material, a water-resistant material, and a stain-resistant material.

13. A passenger seat comprising:
a seat harness apparatus;
a seat backrest supported by an internal frame structure, the internal frame structure including a first routing channel and a second routing channel for coupling the seat harness apparatus;
aircraft seat spreaders coupled to each side of the internal frame structure of the passenger airplane seat;
a first reinforcing bracket disposed around the first routing channel and the second routing channel, the first reinforcing bracket coupled with the internal frame structure on a back side of the internal frame structure, the back side being opposite the seat harness apparatus; and
wherein a belt of the seat harness apparatus routes between the first routing channel and the second routing channel along the back side of the internal frame structure and over a back side of the first reinforcing bracket;
wherein the internal frame structure further comprises two upper routing channels for receiving the seat harness apparatus, the two upper routing channels disposed at a first height and in a horizontal orientation;
wherein the first and second routing channels of the internal frame structure comprise two lower routing channels for receiving the seat harness apparatus, the two lower routing channels at a second height and in a vertical orientation, the second height being less than the first height; and
wherein the internal frame structure further comprises two middle routing channels for receiving the seat harness apparatus, the two middle routing channels disposed at a third height and in a horizontal orientation, the third height being less than the first height and greater than the second height.

14. The passenger airplane seat of claim 13, further comprising an upper bracket for reinforcing the two upper routing channels, the upper bracket coupled with the back side of the internal frame structure at the first height, the upper bracket disposed around the two upper routing channels such that the upper bracket surrounds an opening of the two upper routing channels along the back side of the internal frame structure.

15. The passenger airplane seat of claim 14, wherein the first reinforcing bracket comprises a lower bracket for reinforcing the two lower routing channels, the lower bracket coupled with the back side of the internal frame structure at the second height, the lower bracket disposed around the two lower routing channels such that the first reinforcing bracket surrounds an opening of the two lower routing channels along the back side of the internal frame structure.

16. The passenger airplane seat of claim 15, further comprising a middle bracket for reinforcing the two middle routing channels, the middle bracket coupled with the back side of the internal frame structure at the third height, the middle bracket disposed around the two middle routing channels such that the middle bracket surrounds an opening of the two middle routing channels along the back side of the internal frame structure.

17. The passenger airplane seat of claim 16, further comprising an seat harness apparatus, a belt of the seat harness apparatus routing horizontally between the two lower routing channels along the back side of the internal frame structure and a belt of the seat harness routing vertically between one of the two upper routing channels and one of the two middle routing channels.

18. A passenger airplane seat for use in commercial aircraft, the passenger airplane seat comprising:
a seat base coupled with a seat backrest for supporting a seated passenger, the seat backrest internally supported by an internal frame structure;
seat spreaders disposed on opposing sides of the seat base;
a seat belt attached to the seat spreaders;
the seat backrest including an integrated seat, the integrated seat comprising an integrated seat base, an integrated seat backrest, and a five-point harness; and
the integrated seat base moveable between a stowed position and a deployed position, whereby the passenger airplane seat is configured to accommodate an adult passenger when the integrated seat base is in the stowed position and further configured to accommodate a child passenger when the integrated seat base is in the deployed position;
wherein the five-point harness of the integrated seat couples with the internal frame structure by routing belts of the five-point harness between a plurality of routing channels extending through the integrated seat backrest and through the internal frame structure such that the belts of the five-point harness extend along the backside of the internal frame structure between two of the plurality of routing channels;

wherein one or more reinforcing brackets are coupled with a back side of the internal frame structure and disposed around the plurality of routing channels, the back side being opposite the integrated seat; and wherein at least one of the routing channels of the plurality of routing channels extends through the one or more reinforcing brackets such that the one or more reinforcing brackets surround an opening of the at least one routing channel on the back side of the internal frame structure.

* * * * *